United States Patent [19]

Arai et al.

[11] Patent Number: 5,452,436
[45] Date of Patent: Sep. 19, 1995

[54] SYSTEM FOR CONNECTING PLURALITY OF ELECTRONIC UNITS TO DATA AND CLOCK BUSES WHEREIN TRANSMITTING AND RECEIVING DATA IN SYNCHRONIZATION WITH TRANSMITTING AND RECEIVING CLOCK SIGNALS

[75] Inventors: Kiyokazu Arai; Akira Yamagiwa; Toshihiro Okabe, all of Hadano, Japan

[73] Assignee: Hitachi, Ltd., Tokyo, Japan

[21] Appl. No.: 367,927

[22] Filed: Jan. 3, 1995

Related U.S. Application Data

[63] Continuation of Ser. No. 573,773, Aug. 28, 1990, abandoned.

[30] Foreign Application Priority Data

Aug. 28, 1989 [JP] Japan ................. 1-221067

[51] Int. Cl.⁶ ........................................... G06F 1/04
[52] U.S. Cl. ..................... 395/550; 395/200.19; 364/229; 364/270.7; 364/271.2; 364/DIG. 1
[58] Field of Search ................. 395/200, 325, 550

[56] References Cited

U.S. PATENT DOCUMENTS

| | | | |
|---|---|---|---|
| 3,774,157 | 11/1973 | Tsui | 395/550 |
| 4,164,787 | 8/1979 | Aranguren | 395/425 |
| 4,354,227 | 10/1982 | Hays, Jr. et al. | 395/725 |
| 4,503,490 | 3/1985 | Thompson | 395/550 |
| 4,523,274 | 6/1985 | Fukunaga et al. | 364/200 |
| 4,527,075 | 7/1985 | Zbinden | 307/265 |
| 4,691,294 | 9/1987 | Humpleman | 364/900 |
| 4,805,195 | 2/1989 | Keegan | 375/106 |
| 4,815,109 | 3/1989 | Kao | 375/107 |
| 4,866,664 | 9/1989 | Burkhardt, Jr. et al. | 364/900 |
| 4,881,165 | 11/1989 | Sager et al. | 395/550 |
| 4,882,738 | 11/1989 | Suzuki | 307/269 |
| 5,006,979 | 4/1991 | Yoshie | 364/200 |
| 5,133,064 | 7/1992 | Hotta et al. | 395/550 |
| 5,237,670 | 8/1993 | Wakerly | 395/425 |

OTHER PUBLICATIONS

"VLSI Computer I", Chapter 4, Items 4 & 5 (Input-/Output Control) Iwanami Koza, Microelectronic, No. 8, pp. 263–274, Dec. 10, 1984.

*Primary Examiner*—Thomas C. Lee
*Assistant Examiner*—Moustafa M. Meky
*Attorney, Agent, or Firm*—Antonelli, Terry, Stout & Kraus

[57] ABSTRACT

A data processing apparatus, including a number of electronic circuit units, in which high-speed data can be transmitted among the electronic circuit units. When data is transmitted from one electronic circuit unit to another electronic circuit unit, a clock signal to fetch the data in the sink side electronic circuit unit is transmitted from the source side electronic circuit unit via a clock signal line having the same signal propagation delay characteristics as those of the data signal line.

9 Claims, 8 Drawing Sheets

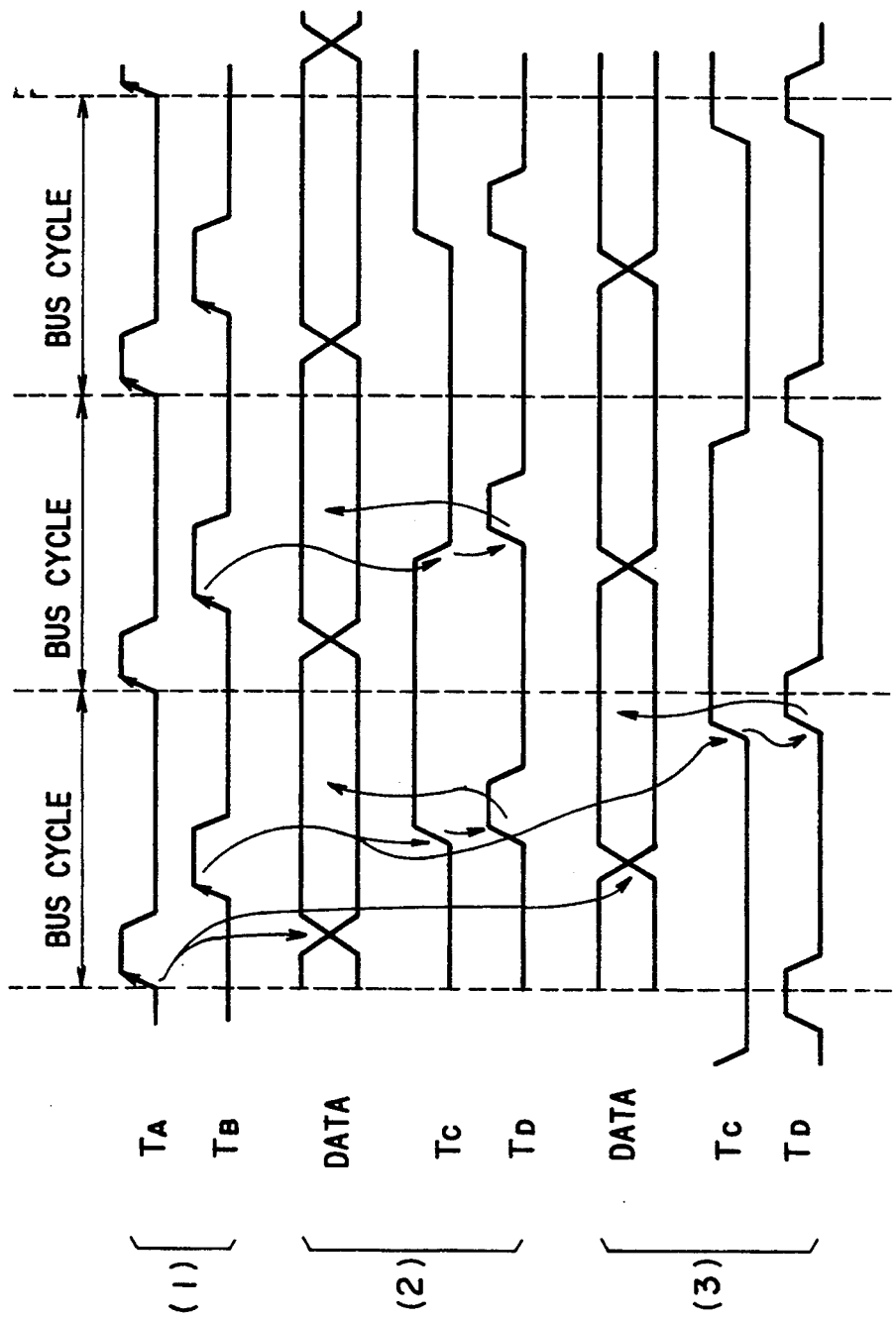

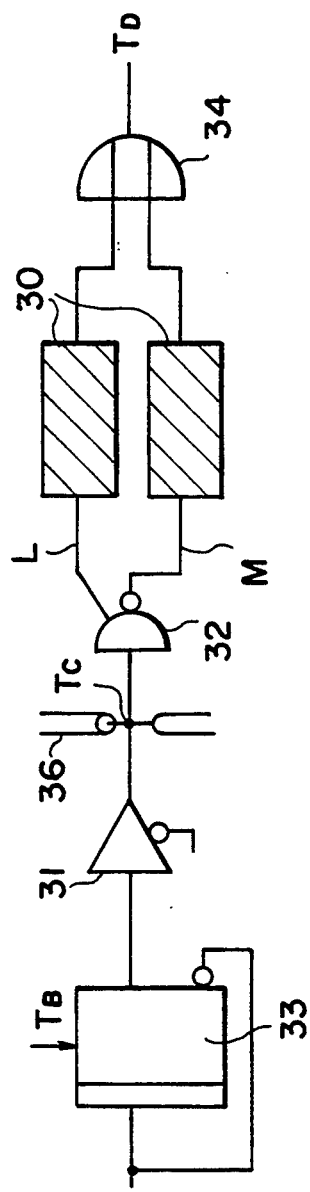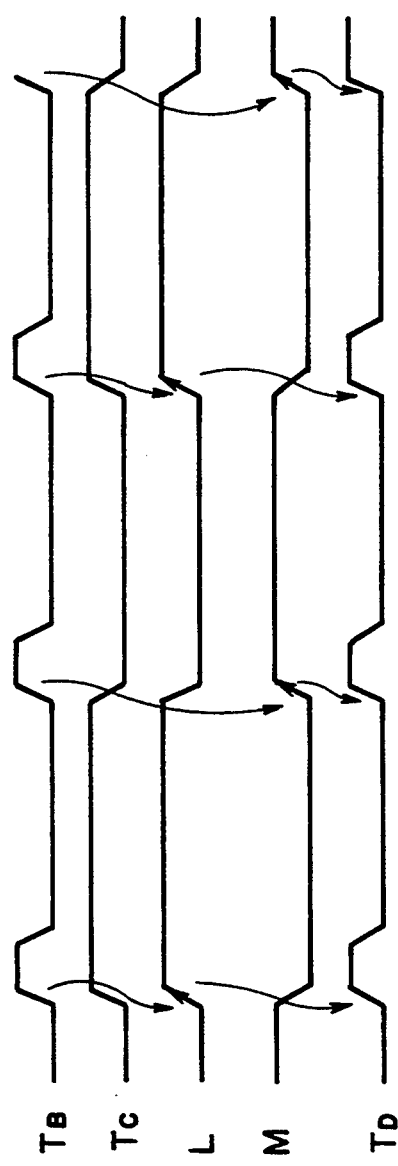
FIG. 3A
FIG. 3B r# SYSTEM FOR CONNECTING PLURALITY OF ELECTRONIC UNITS TO DATA AND CLOCK BUSES WHEREIN TRANSMITTING AND RECEIVING DATA IN SYNCHRONIZATION WITH TRANSMITTING AND RECEIVING CLOCK SIGNALS This application is a Continuation application of Ser. No. 07/573,773, filed Aug. 28, 1990, now abandoned.

BACKGROUND OF THE INVENTION

The present invention relates to a data processing apparatus for transmitting data among a plurality of electronic circuit units which are physically separated.

In a conventional data transmission system of an electronic computer or the like, the data system and the clock system are independent. Therefore, for instance, in the case where logic units which are connected to a data bus are used as packages, and transmission lines to connect the logic units are wired on a back board on which the packages are mounted, in the data transmission from the package serving as a source unit to the package serving as a sink unit, the clock system is devised to supply a clock signal of the same phase to both the source package and the sink package. However, in the data system, the phase of the sink package is delayed from that of the source package by the propagation delay time of the transmission line.

Such a conventional data transmission system will be described further in detail with reference to FIG. 5A.

In the diagram, reference numeral 1 denotes a 3-state output buffer gate. The 3-state output buffer gate is set into the enable state in the case where it is used as a source gate to transmit data to a bus, while it is set into the disable state in the case where it is not used as a source gate. The same shall apply hereinbelow in the specification. Reference numeral 2 indicates an input buffer gate; 3 an output flip-flop to determine the phase of, the data which is transmitted to the bus; 4 denotes an input flip-flop to receive data from the bus; 6 a data bus line; 7 a terminal resistor of the data bus line; 8a to 8z packages in which electronic parts such as LSI components and the like are installed; and $T_A$ and $T_B$ clock signal which are common among the packages. The clock signal $T_A$ and $T_B$ are outputs from a clock phase adjuster 10 provided in each package. Each of the clock phase adjusters 10 receives clock signal from a clock generator 9 provided in only the package 8a and adjusts the clock signal $T_A$ and $T_B$ to substantially the same phase in each package. The clock signal $T_A$ and $T_B$ are used as set timing signals of the output flip-flop 3 and the input flip-flop 4, respectively.

A construction of the data bus has been disclosed in "VLSI computer I", Chapter 4, Item 4 and 5 (Input-/Output Control), Iwanami Koza Microelectronics, No. 8, pages 263 to 274, Dec. 10, 1984.

A time chart for the system of FIG. 5A is shown in FIG. 5B. In FIGS. 5B, (1) to (4) indicate data waveforms on the side of the packages 8a, 8b, 8c, and 8z in the case of transmission data from the package 8a to the packages 8b, 8c, and 8z, respectively.

In the conventional data transmission system as shown in FIG. 5A, in-all of the packages, the phase difference between the clocks $T_A$ and $T_B$ is minimized. However, as shown in FIG. 5B, for instance, the data transmission time in the case of transmitting from the package 8a to the package 8b differs from the data transmission time in the case of transmitting from the package 8a to the package 8z. Thus, there is a problem such that in the case of transmitting high-speed data of a short data period, the propagation delay time of the transmission line cannot be ignored, and it is impossible to assure a set-up time and a holding time of the flip-flop to fetch the data by the sink package, and the data cannot be correctly transmitted.

SUMMARY OF THE INVENTION

The present invention is made to solve the above problems.

According to the invention, in the case of mutually executing data transmission among a plurality of electronic circuit units, when data is transmitted from a certain electronic circuit unit to another electronic circuit unit, a clock to fetch the data in the sink side electronic circuit unit is transmitted from the source side electronic circuit unit via a signal line having the same signal propagation delay characteristics as those of the signal line for data transmission.

According to the invention, in the case of transmitting data of a very short period, normal data transmission can be performed irrespective of the length of data bus line.

BRIEF DESCRIPTION OF THE DRAWINGS

FIG. 1B is a time chart showing waveforms of clock signals in FIG. 1A;

FIGS. 3A and 4A are diagrams showing clock generating circuits in FIGS. 1A and 2A;

FIGS. 3B and 4B are time charts showing the generation of clock signals in detail.

DESCRIPTION OF THE PREFERRED EMBODIMENT

Embodiments of the present invention will be practically described hereinbelow with reference to the drawings.

Figure 1A:
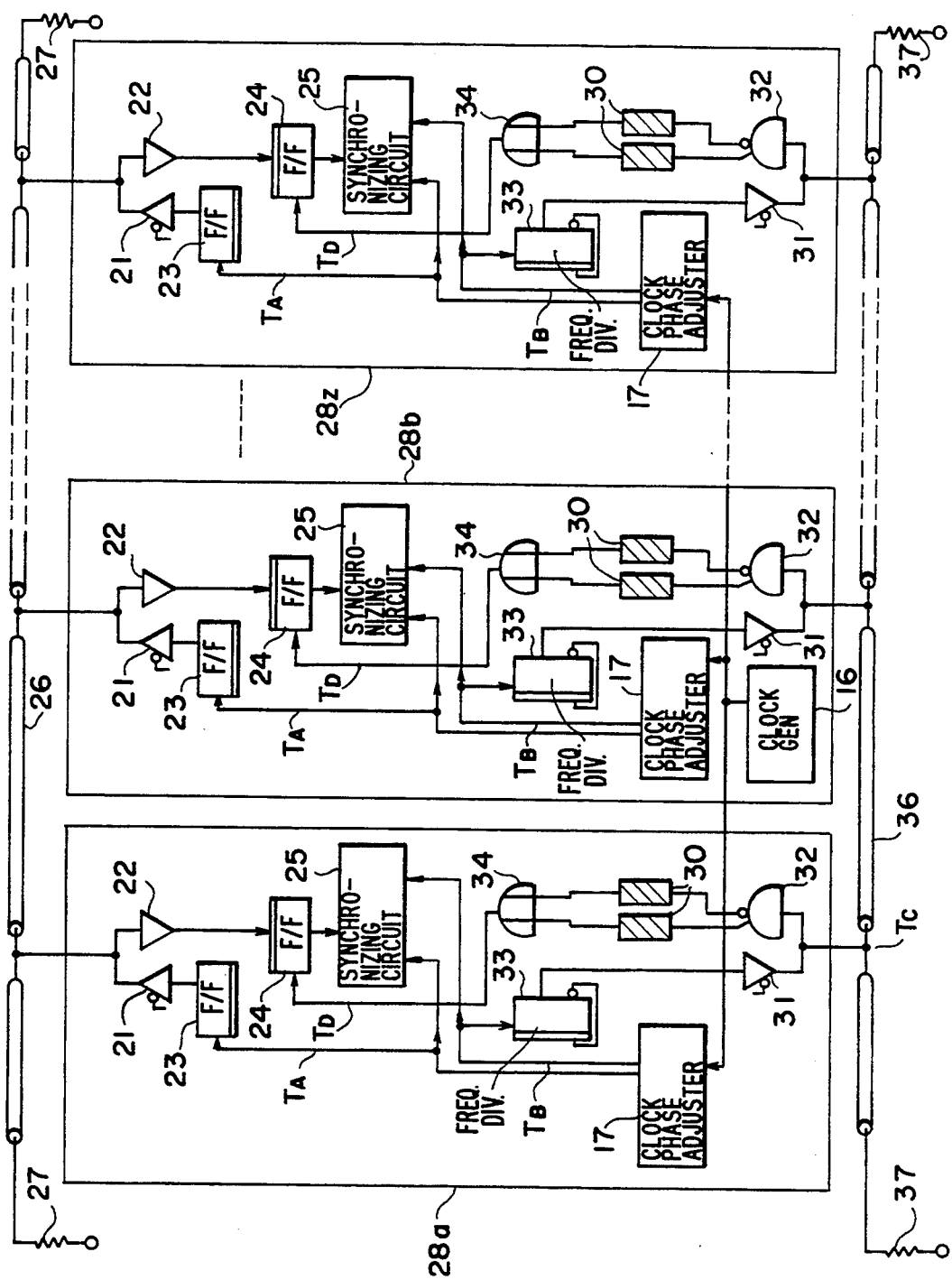
FIG. 1A is a diagram showing a first embodiment of a data transmission system of the present invention.

FIG. 1A shows an embodiment of a data transmission system of the invention.

In the diagram, reference numeral 21 denotes a 3-state output buffer gate; 22 an input buffer gate; 23 an output flip-flop to determine the phase of data which is transmitted to a data bus; and 24 an input flip-flop to receive data from the data bus. Since there is a possibility such that the data which is output from the input flip-flop 24 is out of the phase with the inherent bus cycle, that data is input to a sync circuit 25 to synchronize the data with the original clock signals ($T_A$, $T_B$). Reference numeral 26 denotes a data bus to transmit data; 27 indicates a terminal resistor of the data bus 26; and 28a to 28z are packages in which electronic parts such as LSI components and the like are installed.

Figure 5A:
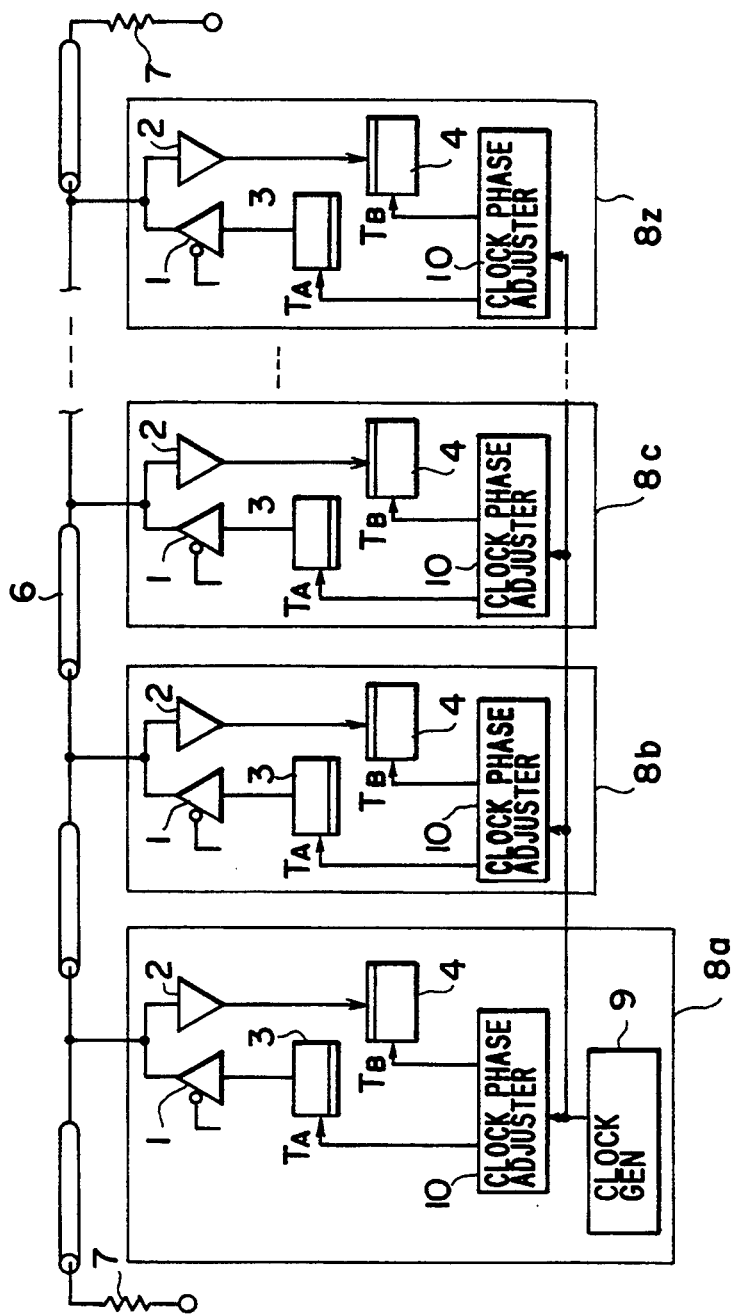
FIG. 5A is a diagram showing a conventional data transmission system.
Figure 5B:
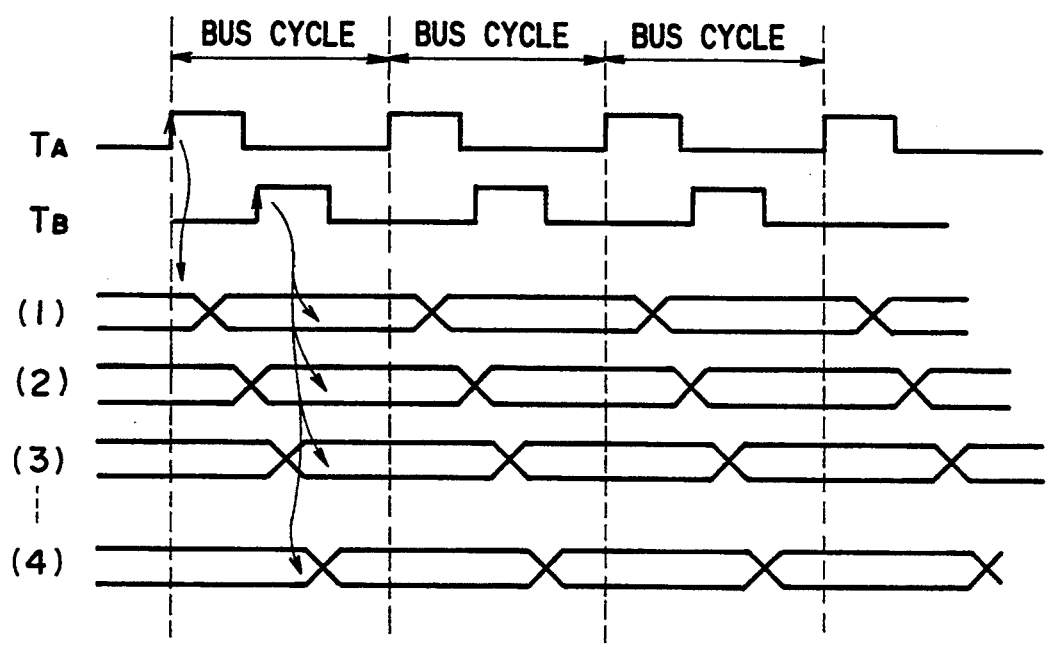
FIG. 5B is a time chart showing the operation of a conventional data transmission system as shown in FIG. 5A.

A clock generator 16 and a clock phase adjuster 17 are the same as those shown in FIG. 5A in the conventional technique. Each of the packages 28a to 28z further has therein: a frequency dividing circuit 33 to obtain clock signals by frequency dividing the clock signals $T_B$ into ½; a 3-state output buffer gate 31 to transmit the clock signals from the frequency dividing circuit 33 to a clock bus 36; an input buffer gate 32 to receive clock signals $T_C$ which were transmitted by the clock bus 36; a circuit 30 to differentiate and shape input pulses by the leading and trailing edges of the clocks $T_C$ received by the input buffer gate 32; and an OR gate 34. The clock bus 36 comprises one signal line having the same line length, the same number of loads, and the same matching terminal resistance as those of the data bus 26. Reference numeral 37 denotes a terminal resistor of the clock bus 36.

FIG. 1B is a time chart showing the phase relation between the data and the clock signals.

The operation of the first embodiment of the invention will now be described with reference to FIG. 1B. For instance, in the case of transmitting data from the package 28a to the package 28b through the data bus 26, the clock signals are also similarly transmitted from the package 28a to the package 28b via the clock bus 36.

In the package 28b, pulses $T_D$ are produced from the received clock signals $T_C$, and the data which is transmitted via the data bus 26 is fetched by the pulses $T_D$. (1) and (2) in FIG. 1B denote time charts for the source package 28a and the sync package 28b at this time, respectively.

Although the transmission data is also similarly transmitted to the packages other than the package 28b at this time, the fetching of the data is inhibited in the packages other than the package 28b.

The same shall also apply to the case of transmitting data from the package 28a to the package 28z through the data bus 26. (3) in FIG. 1B shows a time chart for the sync package 28z at this time.

The reason why the clock signals which are obtained by frequency dividing the clock signals $T_B$ into ½ are transmitted to the clock bus 36 is because since the pulse width of the clock signals $T_B$ is small, the waveform is deformed due to the influence of capacitive reflection or the like upon bus transmission and there is a possibility that the clock signals are not correctly transmitted. By frequency dividing the clock signals $T_B$ and by widening the pulse width, even if such a waveform distortion occurs, the clock signals can be transmitted as clock pulses.

By transmitting both the data and the clock signals from the source package to the sync package via the buses having the same propagation delay time, the high-speed data transmission can be achieved.

The above embodiment has been shown and described with respect to the case where there is not so a large difference in the driving capability of the output buffer gate 31 to the clock bus between the leading and trailing portions of the pulse waveform.

Figure 2A:
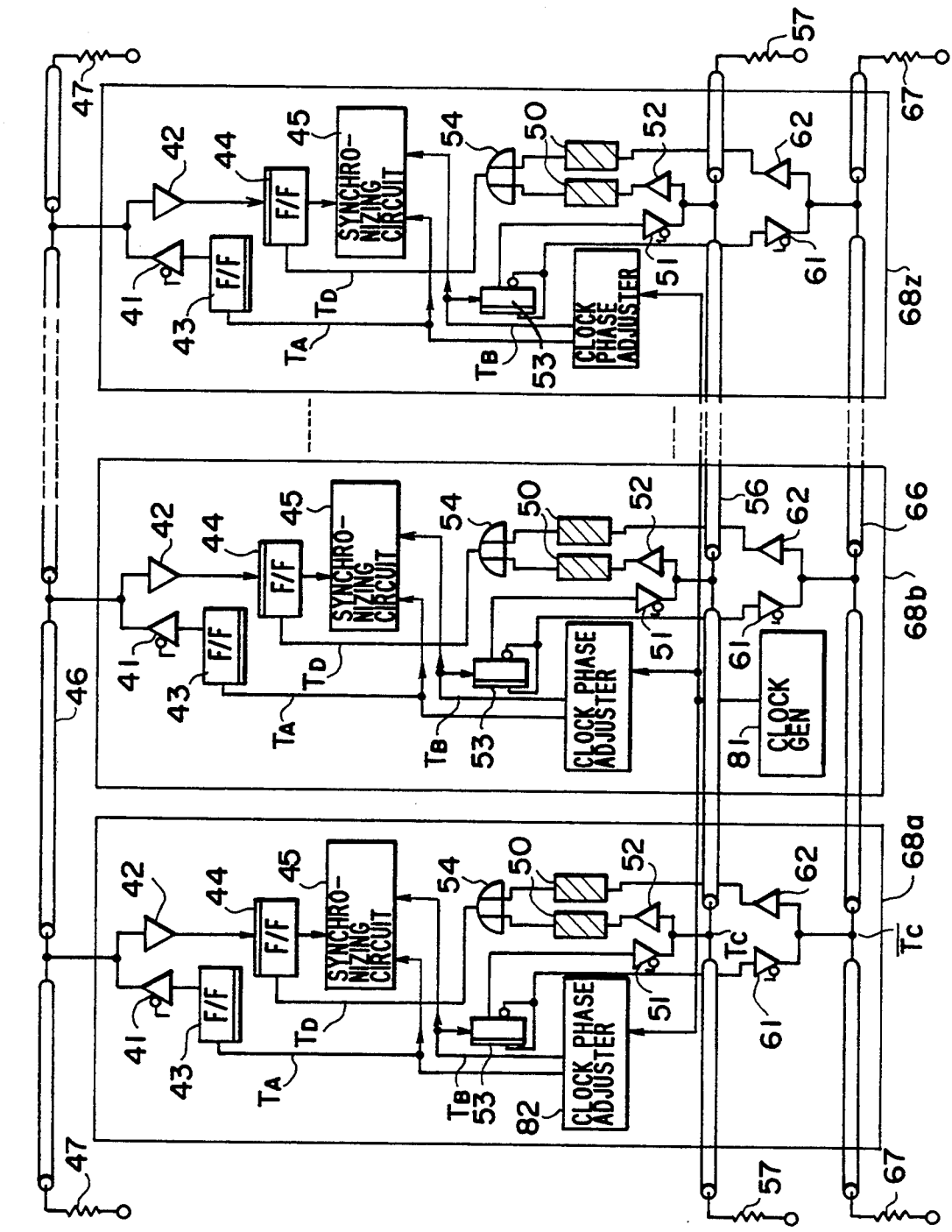
FIG. 2A is a diagram showing a second embodiment of the invention.

FIG. 2A shows another embodiment of the invention in which the clock bus is constructed by two signal lines.

In the diagram, reference numeral 41 denotes a 3-state output buffer gate to a data bus; 42 an input buffer gate from the data bus; 43 an output flip-flop to determine the phase of data which is transmitted to the data bus; 44 an input flip-flop to receive data from the data bus; 46 a data bus; 47 a terminal resistor of the data bus; 68a to 68z packages in which electronic parts such as LSI components and the like are installed; 56 and 66 clock buses; 57 and 67 terminal resistors of the clock buses; 51 and 61 3-state output buffer gates to the clock buses 57 and 67; 52 and 62 input buffer gates to receive the clock signals $T_C$ and $\overline{T_C}$ which are transmitted by the clock buses 57 and 67; 50 a circuit to differentiate and shape the pulses by the leading edges of the pulses of the clock signals $T_C$ and $\overline{T_C}$ which are received via the input buffer gates 52 and 62; and 53 a frequency dividing circuit to frequency divide the clock signals $T_B$ into ½. A clock generator 81 and a clock phase adjuster 82 are the same as those shown in FIGS. 1A and 5A.

If loads on the clock buses are heavy, there is a case where the transmission times of the clock buses differ between the leading edges of the outputs of the 3-state output buffer gates 51 and 61 as driver gates of the clock buses and the trailing edges of those outputs.

Figure 2B:
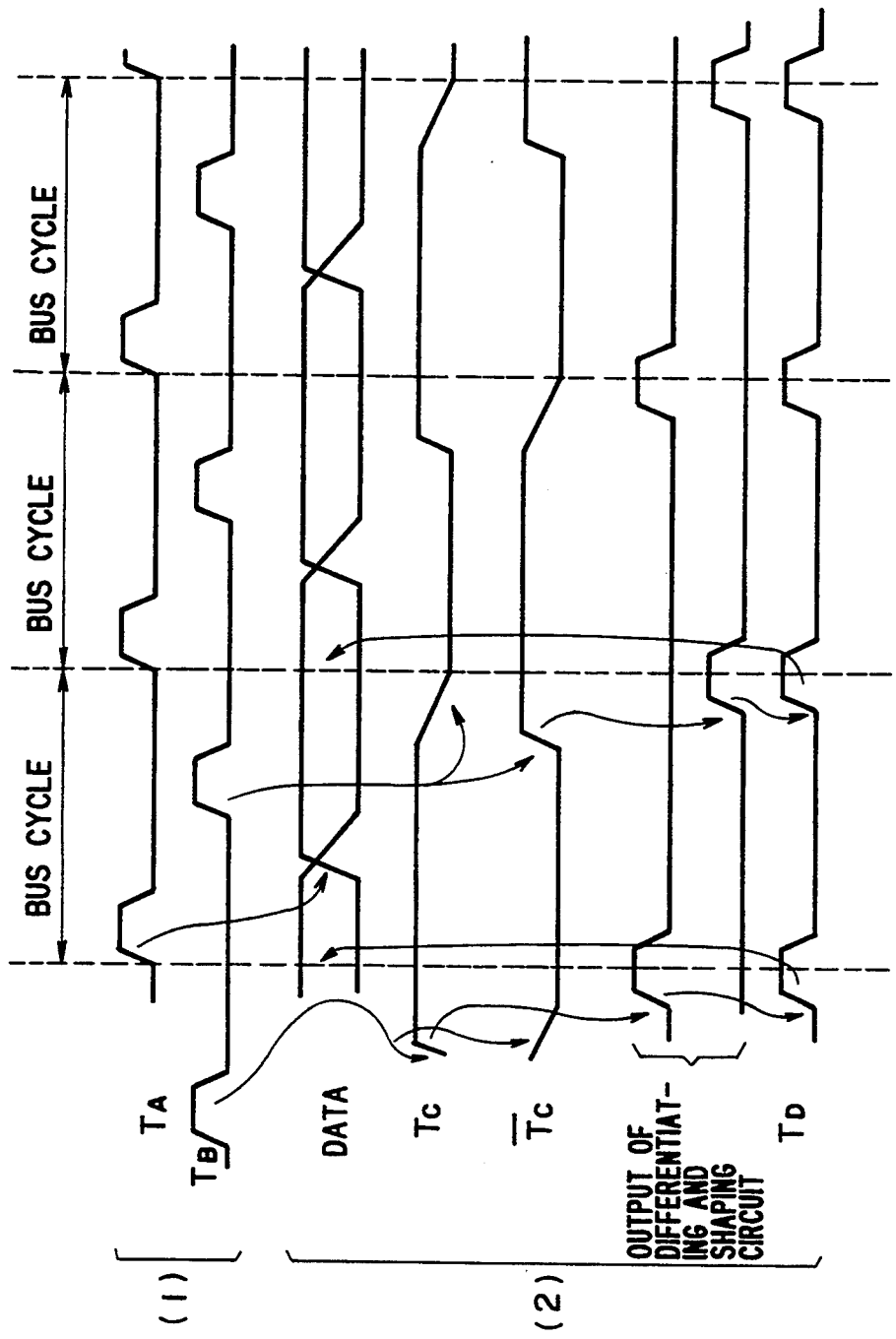
FIG. 2B is a time chart showing waveforms of clock signals in FIG. 2A.

Therefore, in the second embodiment of the invention, the polarities of the clock signals which are transmitted by the clock buses 56 and 66 are set to be opposite. Thus, even if load dependencies of the leading and trailing edges of the outputs of the output buffer gates 51 and 61 differ, if the differentiation shaping circuit 50 differentiates and shapes in response to the leading edges of the clock pulses of the clock bus 56 and the leading edges of the clock pulses of the clock bus 66, the clock pulses are produced without fluctuating the clock period of the output waveform of the OR gate 54. FIG. 2B shows time charts for the packages 68a and 68z in the case of transmitting data from the package 68a to the package 68z.

The difference between the clock pulse waveforms in FIGS. 1B and 2B will now be described further in detail with reference to FIGS. 3 and 4.

Figure 4A:
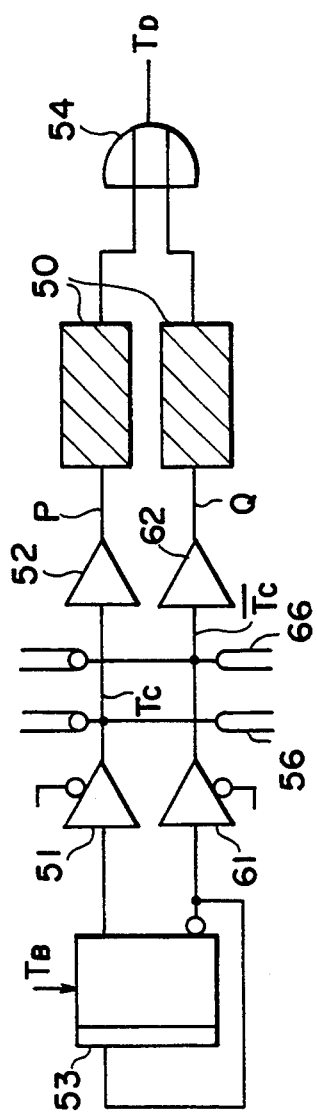
Figure 4B:
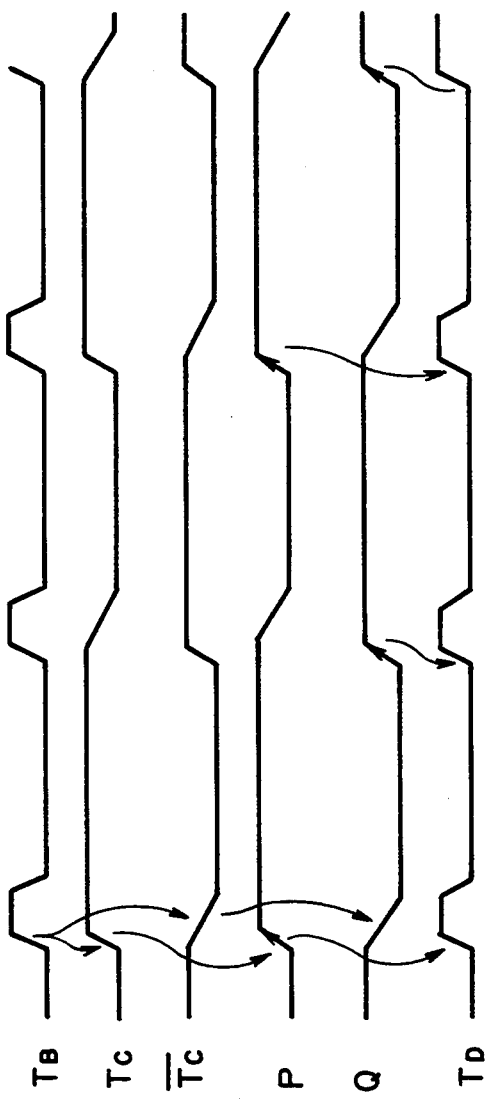

FIGS. 3A and 4A are diagrams showing the output sides of the clock frequency dividing circuits 33 and 53 in FIGS. 1A and 2A, respectively. FIGS. 3B and 4B show time charts for the circuits 33 and 53.

In FIGS. 3A and 3B, the clock bus comprises one signal line. The polarity of the clock signals $T_C$ on the clock bus 36 is set to two polarities (L, M) by the gate 32, and the clock signals $T_C$ are differentiated and shaped by the leading portions of the pulses of both polarities, thereby producing the clock signals $T_D$.

On the other hand, in FIG. 4, in order to avoid the influence by the difference between the load dependencies of the leading and trailing edges of the outputs of the 3-state output buffer gates 51 and 61, the clock bus is constructed as two signal lines. By differentiating and shaping the clock signals in response to the leading portions (leading portions of a signal P) of the clock signals $T_C$ of the clock bus 56 and the leading portions (leading portions of a signal Q) of the clocks $\overline{T_C}$ of the clock bus 66, the fluctuation in clock period of the clock signals $T_D$ is prevented.

According to the present invention, in the case where data with a short period is transmitted, an ordinary data transmission is achieved regardless of a data bus length.

We claim:

1. A data processing system, comprising:
    a data signal line for transmitting data signals;
    a first clock signal line for transmitting first clock signals, said first clock signal line having the same signal propagation delay characteristics as the data signal line;
    a second clock signal line for transmitting second clock signals, said second clock signal line having the same signal propagation delay characteristics as the data signal line; and a plurality of physically separated electronic circuit units connected to said data signal line, said first clock signal line, and said second clock signal line so that the distance on said data signal line from one electronic circuit unit to another electronic circuit unit, the distance on said first clock signal line from said one electronic circuit unit to said another electronic circuit unit, and the distance on said second clock signal line from said one electronic circuit unit to said another electronic circuit unit are substantially the same, each electronic circuit unit including:

(a) a clock circuit for generating clock signals;
(b) data signal output means for outputting data signals to the data signal line;
(c) clock signal output means for outputting clock signals from said clock circuit to the first clock signal line as first clock signals and inverted clock signals from said clock circuit to said second clock signal line as second clock signals;
(d) means for receiving the first clock signals from the first clock signal line and the second clock signals from the second clock signal line; and means for receiving the data signals from the data signal line as the first and second clock signals are received.

2. A data processing system, comprising:
a clock generator for generating a clock signal;
a data signal bus for transmitting data signals;
a clock signal bus having the same signal propagation delay characteristic as the data signal bus, for transmitting clock signals; and
a plurality of electronic circuit units connected to the data signal bus and the clock signal bus so that the distance on the data signal bus between any two of the electronic circuit units is the same as the distance on the clock signal bus between said two of the electronic circuit units, each of the electronic circuit units comprising:

(a) a clock adjusting circuit responsive to the clock signal from the clock generator, for generating an inner electronic circuit clock signal, the inner electronic circuit clock signals of all the electronic circuit units being substantially in phase with each other;
(b) a data outputting circuit connected to the data signal bus, for outputting a data signal to the data signal bus in response to the inner electronic circuit clock signal;
(c) a data receiving circuit connected to the data signal bus, for receiving a data signal from the data signal bus;
(d) a clock outputting circuit for outputting the inner electronic circuit clock signal to the clock signal bus; and
(e) a clock receiving circuit responsive to a clock signal received from the clock signal bus, for outputting a data reception clock signal; wherein:

the electronic circuit unit outputs a clock signal to the clock signal bus when a data signal is transmitted to the data signal bus;
the data receiving circuit is responsive to the data reception clock signal for receiving a data signal from the data signal bus; and
when a first one of the electronic circuit units transmits a data signal and a clock signal to the other electronic circuit units, the transmitted clock signal is inputted into each of the other electronic circuit units with the same relative phases, and the transmitted data signal is inputted into each of the other electronic circuit units with the same relative phases.

3. A data processing system according to claim 2, wherein each of the electronic circuit units further comprises a synchronizing circuit for synchronizing data received in the data receiving circuit with the inner electronic circuit clock signal.

4. A data processing system, comprising:
a clock generator for generating a clock signal;
a data signal bus for transmitting data signals;
a clock signal bus having the same signal propagation delay characteristic as the data signal bus;
a plurality of electronic circuit units connected to the data signal bus and the clock signal bus so that the distance on the data signal bus between any two of the electronic circuit units is the same as the distance on the clock signal bus between said two of the electronic circuit units, each of the electronic circuit units, comprising:

(a) a clock phase adjusting circuit responsive to the clock signal from the clock generator, for outputting an inner electronic circuit clock signal, the inner electronic circuit clock signals of all the electronic circuit units being substantially in phase with each other;
(b) a data outputting circuit connected to the data signal bus for determining a phase of a data signal transmitted to the data signal bus in response to the inner electronic circuit clock signal, and for outputting a data signal;
(c) a data receiving circuit connected to the data signal bus, for receiving a data signal from the data signal bus;
(d) a synchronizing circuit responsive to the inner electronic circuit clock signal, for synchronizing the phase of a data signal received in the data receiving circuit with the phase of the inner electronic circuit clock signal;
(e) a dividing circuit for dividing the inner electrical circuit clock signal to generate a divided clock signal;
(f) a clock outputting circuit for outputting the divided clock signal to the clock signal bus; and
(g) a clock receiving circuit responsive to a divided clock signal received from the clock signal bus, for outputting a data reception clock signal; wherein:

the electronic circuit unit outputs the divided clock signal to the clock signal bus when transmitting a data signal to the data signal bus, and
the data receiving circuit is responsive to the data reception clock signal for receiving the data signal from a data signal bus.

5. A data processing apparatus according to claim 4, wherein when a first one of the electronic circuit units transmits the data signal and the divided clock signal to the other electronic circuit units, the transmitted divided clock signal is inputted into each of the other electronic circuit units with the same relative phases, and the data signal is inputted into each of the other electronic circuit units with the same relative phase.

6. A data processing system, comprising:
a clock generator for generating a clock signal;
a data signal bus for transmitting data signals;

a clock signal bus having a signal propagation delay characteristic similar to that of the data signal bus, for transmitting clock signals; and a plurality of electronic circuit units connected to the data signal bus and the clock signal bus, the distance on the data signal bus between any two electronic circuit units being the same as the distance on the clock signal bus between said two of the electronic circuit units, each of the electronic circuit units, comprising:

(a) a clock phase adjuster responsive to the clock signal from the clock generator, for outputting a first clock signal and a second clock signal, the first clock signals of all the electronic circuit units being substantially in phase with each other, and the second clock signals of all the electronic circuit units being substantially in phase with each other;

(b) a data outputting gate connected to the data signal bus, for outputting a data signal to the data signal bus;

(c) a data outputting flip-flop circuit connected to the data outputting gate and receiving a first clock signal, for determining the phase of a data signal transmitted to the data signal bus in response to a first clock signal;

(d) a data inputting gate connected to the data signal bus, for receiving a data signal from the data signal bus;

(e) a data inputting flip-flop circuit connected to the data inputting gate, for receiving a data signal from the data signal bus;

(f) a synchronizing circuit responsive to the first clock signal and the second clock signal, for synchronizing the phase of data outputted from the data inputting flip-flop circuit with the phases of the first clock signal and the second clock signal;

(g) a dividing circuit for dividing the second clock signal to provide a divided clock signal;

(h) a clock outputting gate for transmitting the divided clock signal to the clock signal bus;

(i) a clock inputting gate for receiving a divided clock signal from the clock signal bus; and (j) a pulse generating circuit for shaping the divided clock signal received in the clock inputting gate and generating a data reception clock signal, wherein the electronic circuit unit outputs the divided clock signal to the clock signal bus when transmitting a data signal to the data signal bus, and the data inputting flip-flop circuit receives a data signal from the data signal bus in response to the data reception clock signal.

7. A data processing system according to claim 6, wherein when a first one of the electronic circuit units transmits the data signal and the divided clock signal to the other electronic circuit units, the transmitted divided clock signal is inputted into the clock inputting gates of each of the other electronic circuit units with the same relative phases, and the data signal is inputted into the data inputting flip-flop circuits of each of the other electronic circuit units with the same relative phases.

8. A data processing system according to claim 6, wherein the dividing circuit divides the second clock signal by two to obtain the divided clock signal.

9. A data processing system according to claim 8, wherein the pulse generating circuit differentially shapes a leading edge and a trailing edge of the clock signal received in the clock inputting gate to generate the data reception clock signal.

* * * * *